United States Patent
Park et al.

(10) Patent No.: US 12,264,231 B2
(45) Date of Patent: Apr. 1, 2025

(54) POLYAMIDE-IMIDE FILM

(71) Applicants: SK Innovation Co., Ltd., Seoul (KR); SK ie technology Co., Ltd., Seoul (KR)

(72) Inventors: Sangyoon Park, Daejeon (KR); Hye Ri Kim, Daejeon (KR); Hyejin Kim, Daejeon (KR); Seungmin Jeon, Daejeon (KR); Jisang Jeong, Daejeon (KR)

(73) Assignees: SK Innovation Co., Ltd., Seoul (KR); SK ic technology Co., Ltd., Seoul (KR)

( * ) Notice: Subject to any disclaimer, the term of this patent is extended or adjusted under 35 U.S.C. 154(b) by 671 days.

(21) Appl. No.: 17/614,624

(22) PCT Filed: May 29, 2020

(86) PCT No.: PCT/KR2020/006976
§ 371 (c)(1),
(2) Date: Nov. 29, 2021

(87) PCT Pub. No.: WO2020/242242
PCT Pub. Date: Dec. 3, 2020

(65) Prior Publication Data
US 2022/0227964 A1    Jul. 21, 2022

(30) Foreign Application Priority Data

May 31, 2019    (KR) .................... 10-2019-0064960
May 28, 2020    (KR) .................... 10-2020-0064333

(51) Int. Cl.
*C08K 5/3472*    (2006.01)
*C08G 73/10*    (2006.01)

(52) U.S. Cl.
CPC ........ *C08K 5/3472* (2013.01); *C08G 73/1007* (2013.01)

(58) Field of Classification Search
CPC .... C08G 69/26; C08G 69/32; C08G 73/1007; C08G 73/1039; C08G 73/1042; C08G 73/1067; C08G 73/1075; C08G 73/14; C08J 5/18; C08K 5/0041; C08K 5/3467; C08K 5/3472; C08L 79/08; G02F 1/1333
See application file for complete search history.

(56) References Cited

U.S. PATENT DOCUMENTS

| | | |
|---|---|---|
| 2014/0049807 A1 | 2/2014 | Kato |
| 2016/0053138 A1 | 2/2016 | Lee et al. |
| 2017/0183462 A1 | 6/2017 | Song et al. |
| 2019/0006563 A1 | 1/2019 | Sato et al. |
| 2019/0077960 A1 | 3/2019 | Kim et al. |

FOREIGN PATENT DOCUMENTS

| | | | |
|---|---|---|---|
| CN | 107760027 A | | 3/2018 |
| JP | 201287236 A | | 5/2012 |
| JP | 201364975 A | | 4/2013 |
| JP | 201438253 A | | 2/2014 |
| JP | 2016118772 A | * | 6/2016 |
| JP | 2018180560 A | | 11/2018 |
| KR | 1020160024003 A | | 3/2016 |
| KR | 1020160130112 A | | 11/2016 |
| KR | 1020190029110 A | | 3/2019 |
| WO | 2018117551 A1 | | 6/2018 |

OTHER PUBLICATIONS

JP-2016118772-A (Jun. 30, 2016) machine translation.*

* cited by examiner

*Primary Examiner* — Ana L. Woodward
(74) *Attorney, Agent, or Firm* — The Webb Law Firm

(57) ABSTRACT

Provided is a polyamide-imide film including: a polyamide-imide resin and a porphyrin-based dye. The polyamide-imide film has excellent optical properties, and, in particular, may maintain an excellent yellow index even in a repeated temperature change environment.

12 Claims, No Drawings

POLYAMIDE-IMIDE FILM

CROSS-REFERENCE TO RELATED APPLICATIONS

This application is the United States national phase of International Application No. PCT/KR2020/006976 filed May 29, 2020, and claims priority to Korean Patent Application Nos. 10-2019-0064960 filed May 31, 2019 and 10-2020-0064333 filed May 28, 2020, the disclosures of which are hereby incorporated by reference in their entirety.

BACKGROUND OF THE INVENTION

Field of the Invention

The present invention relates to a polyamide-imide film including a dye.

Description of Related Art

A high heat-resistant polyimide resin refers to a high heat-resistant resin prepared by subjecting an aromatic diamine and an aromatic dianhydride to solution polymerization to prepare a polyamic acid derivative and then imidizing the polyamic acid derivative by chemical curing and/or thermal curing.

Since the polyimide resin has not only high heat resistance but also excellence in thermal oxidation resistance, radiation resistance, low temperature characteristics, chemical resistance, and the like, it is used in various fields of advanced heat-resistant materials such as automobile materials, aircraft materials, spacecraft materials; and electronic materials such as insulating coatings, insulating films, semiconductors, and electrode protection films of TFT-LCD.

In addition, it is a recent trend that the polyimide resin is employed in various fields such as optical fibers, display materials such as liquid crystal alignment films, transparent electrode films, transparent displays, and flexible displays.

However, a polyimide film made of a high heat-resistant polyimide resin is characterized by being colored brown or yellow due to a high aromatic ring density. Thus, in order to use the polyimide film in the fields requiring transparency, improvement of yellow index (YI) is definitely needed.

For this, a method of including a dye or a pigment in a polyimide film has been suggested. However, when the dye or pigment is used, a light transmittance is deteriorated when a yellow index is improved, since the yellow index and the light transmittance are in an inverse relationship with each other.

Furthermore, due to problems such as solubility and dispersibility of a dye and a pigment, the light transmittance and haze properties of the polyimide film may be deteriorated. Thus, it is difficult to provide a polyimide film having excellent light transmittance, yellow index, and haze.

In particular, in order to employ a polyimide film in a display field, it is necessary to maintain the yellow index even in repeated temperature changes, for example, in repeated changes in high temperature and room temperature.

Therefore, development of a polyimide film which has excellent optical properties and also may maintain an excellent yellow index even in a repeated temperature change environment is needed.

SUMMARY OF THE INVENTION

An object of the present invention is to provide a polyimide film which has excellent optical properties and may maintain an excellent yellow index even in a repeated temperature change environment.

In one general aspect, a polyamide-imide film includes: a polyamide-imide resin and a porphyrin-based dye, the polyamide-imide film having a yellow index (YI) of 2 or less and $\Delta YI_{heat}$ of 0.3 or less.

Herein, $\Delta YI_{heat}$ refers to, when a heat resistance test is performed, a yellow index change value of a polyamide-imide film before and after the heat resistance test, in which in one cycle, the polyamide-imide film is allowed to stand at 80° C. for 2 hours and then to stand at 25° C. for 2 hours, and 200 cycles are carried out repeatedly.

In an exemplary embodiment of the present invention, the polyamide-imide film may have a light transmittance in a visible light area of 88% or more based on 80 μm and a haze of 0.8% or less.

In an exemplary embodiment of the present invention, the polyamide-imide film may have a b* value of −1.3 to 1.3.

In an exemplary embodiment of the present invention, the polyamide-imide film may have a modulus of 3 GPa or more and an elongation at break of 10% or more.

In an exemplary embodiment of the present invention, the polyamide-imide resin may be a copolymerized product of an aromatic diamine, a dianhydride, and an aromatic dicarboxylic acid or a derivative thereof.

In an exemplary embodiment of the present invention, the aromatic diamine may include a fluorine-based aromatic diamine.

In an exemplary embodiment of the present invention, the dianhydride may include a fluorine-based aromatic dianhydride and a non-fluorine-based aromatic dianhydride.

In an exemplary embodiment of the present invention, the dianhydride may include a fluorine-based aromatic dianhydride and an alicyclic dianhydride.

In an exemplary embodiment of the present invention, a content of the porphyrin-based dye may be 0.0001 to 0.005 parts by weight with respect to 100 parts by weight of the polyamide-imide resin.

In an exemplary embodiment of the present invention, a maximum absorption wavelength in a visible light area of the porphyrin-based dye may be 570 to 599 nm in a MEK solvent.

In an exemplary embodiment of the present invention, a molar absorption coefficient in the maximum absorption wavelength in a visible light area of the porphyrin-based dye may be 10,000 to 1,000,000 L/mol·cm.

In an exemplary embodiment of the present invention, a full width at half maximum (FWHM) for the maximum absorption peak of the porphyrin-based dye may be 100 nm or less.

In an exemplary embodiment of the present invention, a solubility of the porphyrin-based dye in N,N-dimethylacetamide (DMAc) may be 0.5 wt % or more.

In an exemplary embodiment of the present invention, the porphyrin-based dye may have a residual mass at 300° C. of 90% or more as measured at a heating condition of 20° C./min under a nitrogen atmosphere.

The present invention may provide a polyamide-imide film which has excellent optical properties and may maintain an excellent yellow index even in a repeated temperature change environment.

DESCRIPTION OF THE INVENTION

In the present specification, " . . . -based dye" refers to a . . . compound and a derivative thereof. For example, a "porphyrin-based dye" refers to porphyrin and a compound having porphyrin as a parent body and a substituent bonded thereto.

In the present specification, a "fluorine-based compound" may refer to a compound including a fluorine-containing substituent, for example, a fluoro group, a trifluoromethyl group, and the like.

As described above, in order to employ a polyimide film in the fields requiring transparency, for example, in a display field, it is essentially necessary to improve a yellow index (YI) of the polyimide film.

Therefore, methods of adding a dye or pigment for improving the yellow index of a polyimide film have been suggested. However, in the case of adding the dye or pigment, a light transmittance is deteriorated when a yellow index is improved, since the yellow index and the light transmittance are in an inverse relationship with each other.

Furthermore, due to problems such as solubility and dispersibility of a dye and a pigment, the haze properties and light transmittance of the polyimide film may be deteriorated. Thus, it is difficult to provide a polyimide film having excellent light transmittance, yellow index, and haze.

In particular, in order to employ a polyimide film in a display field, it is necessary to maintain the yellow index even in a repeated temperature change environment, for example, in repeated changes in high temperature and room temperature.

Therefore, the present researchers continuously conducted studies for solving the problems, and as a result, found that when a polyimide film is prepared by including a specific polyimide film and a specific dye, not only excellent optical properties but also an excellent yellow index even in a repeated temperature change environment may be maintained.

Specifically, an exemplary embodiment of the present invention relates to a polyimide film including: a resin having a polyamide-imide structure as the specific polyimide resin and a porphyrin-based dye as the specific dye.

Specifically, an exemplary embodiment of the present invention relates to a polyamide-imide film including: a polyamide-imide resin and a porphyrin-based dye.

The polyamide-imide film according to an exemplary embodiment of the present invention includes a polyamide-imide resin and a porphyrin-based dye, thereby having excellent optical properties, and, in particular, maintaining an excellent yellow index even in a repeated temperature change environment.

Specifically, the polyamide-imide film according to an exemplary embodiment of the present invention may have a yellow index (YI) of 2 or less and $\Delta YI_{heat}$ of 0.3 or less.

Herein, $\Delta YI_{heat}$ refers to, when a heat resistance test is performed, a yellow index change value of a polyamide-imide film before and after the heat resistance test, in which in one cycle, the polyamide-imide film is allowed to stand at 80° C. for 2 hours and then to stand at 25° C. for 2 hours, and 200 cycles are carried out repeatedly.

In some exemplary embodiments, the polyamide-imide film may have a yellow index of 1.8 or less, 1.7 or less, or 1.6 or less.

In some exemplary embodiments, the polyamide-imide film may have $\Delta YI_{heat}$ of 0.2 or less, 0.1 or less, or 0.05 or less. As confirmed in the examples described later, the polyamide-imide film according to an exemplary embodiment of the present invention has $\Delta YI_{heat}$ of 0.04, so that excellent yellow index retention properties may be shown even in a temperature change environment.

In an exemplary embodiment of the present invention, the polyamide-imide film may have alight transmittance in a visible light area of 88% or more based on 80 μm and a haze of 0.8% or less.

In some exemplary embodiments, the polyamide-imide film may have a light transmittance in a visible light area of 89% or more, or 90% or more based on 80 μm. In addition, the haze may be 0.7% or less or 0.6% or less.

In an exemplary embodiment of the present invention, the polyamide-imide film may have a b* value of −1.3 to 1.3, −1.0 to 1.0, or −0.5 to 0.5. When b* is more than 1.3, the polyamide-imide film may be yellow, and when b* is less than −1.3, the polyamide-imide film may be blue, and thus, it is advantageous for color improvement to satisfy the range described above.

In an exemplary embodiment of the present invention, the polyamide-imide film may have a modulus of 3 GPa or more, 4 GPa or more, or 5 GPa or more, and an elongation at break of 10% or more, 15% or more, or 20% or more. In this case, the polyamide-imide film may have a more favorable advantage in the field requiring not only excellent optical properties but also excellent mechanical properties, for example, in a flexible display field.

In an exemplary embodiment of the present invention, the light transmittance of the polyamide-imide film at 590 nm may be lower than average value of the light transmittances at 540 nm and 640 nm by 0.5% to 1.5%. When a deviation of more than 1.5% is shown, the color of the polyamide-imide film may change to blue due to excessive light absorption, and when a deviation of less than 0.5% is shown, a color improvement effect may be insignificant.

In addition, in an exemplary embodiment of the present invention, the light transmittance of the polyamide-imide film at 630 nm may be lower than the light transmittance at 680 nm by 0.5% to 1.5%.

In an exemplary embodiment of the present invention, the polyamide-imide resin may be a copolymerized product of an (a) aromatic diamine; a (b) dianhydride; and an (c) aromatic dicarboxylic acid or a derivative thereof. That is, the polyamide-imide resin may include an aromatic diamine-derived unit, a dianhydride-derived unit, and an aromatic dicarboxylic acid or a derivative thereof-derived unit.

In an exemplary embodiment of the present invention, the polyamide-imide resin may include a fluorine-containing substituent. The fluorine-containing substituent may be, for example, a fluoro group, a trifluoromethyl group, and the like. In this case, the polyamide-imide film may have better dynamic bending properties and optical properties.

In some exemplary embodiments, the polyamide-imide resin may include a fluorine-containing substituent and an aliphatic cyclic (alicyclic) structure. In this case, the polyamide-imide resin may provide a polyamide-imide film having better mechanical properties, dynamic bending properties, and optical properties, by being combined with the porphyrin-based dye. In addition, even in a repeated temperature change environment, a polyamide-imide film having particularly excellent yellow index retention properties may be provided.

In an exemplary embodiment of the present invention, the (a) aromatic diamine may include a fluorine-based aromatic diamine. The fluorine-based aromatic diamine may refer to an aromatic diamine including a fluorine-containing substituent, for example, a fluoro group, a trifluoromethyl group, and the like. In this case, the optical properties of the polyamide-imide film may be improved.

In some exemplary embodiments, the fluorine-based aromatic diamine may include 2,2'-bis(trifluoromethyl)-benzidine (TFMB).

In an exemplary embodiment of the present invention, the (b) dianhydride may include a fluorine-based aromatic dianhydride and a non-fluorine-based aromatic dianhydride. Herein, the fluorine-based aromatic dianhydride refers to an aromatic dianhydride including a fluorine-containing substituent, and the non-fluorine-based aromatic dianhydride refers to an aromatic dianhydride including no fluorine-containing substituent. In this case, the polyamide-imide film may show better mechanical properties.

In an exemplary embodiment of the present invention, the (b) dianhydride may include a fluorine-based aromatic dianhydride and an alicyclic dianhydride. Herein, the aromatic dianhydride refers to a dianhydride including an aromatic ring structure, and the alicyclic dianhydride refers to a dianhydride including an aliphatic ring structure.

In some exemplary embodiments, the (b) dianhydride may include a fluorine-based aromatic dianhydride and an alicyclic dianhydride. In this case, the polyamide-imide film may show better optical properties and mechanical properties.

In some exemplary embodiments, the aromatic dianhydride may be any one or more selected from 4,4'-hexafluoroisopropylidene diphthalic anhydride (6FDA), biphenyltetracarboxylic dianhydride (BPDA), oxydiphthalic dianhydride (ODPA), sulfonyl diphthalic anhydride (SO2DPA), (isopropylidenediphenoxy) bis(phthalic anhydride) (6HDBA), 4-(2,5-dioxotetrahydrofuran-3-yl)-1,2,3,4-tetrahydronaphthalene-1,2-dicarboxylic dianhydride (TDA), 1,2,4,5-benzenetetracarboxylic dianhydride (PMDA), benzophenonetetracarboxylic dianhydride (BTDA), bis(carboxyphenyl) dimethylsilane dianhydride (SiDA), bis(dicarboxyphenoxy) diphenylsulfide dianhydride (BDSDA), and the like.

In some exemplary embodiments, the alicyclic dianhydride may be any one or more selected from 1,2,3,4-cyclobutanetetracarboxylic dianhydride (CBDA), 5-(2,5-dioxotetrahydrofuryl)-3-methylcyclohexene-1,2-dicarboxylic dianhydride (DOCDA), bicyclo[2.2.2]oct-7-ene-2,3,5,6-tetracarboxylic dianhydride (BTA), bicyclooctene-2,3,5,6-tetracarboxylic dianhydride (BODA), 1,2,3,4-cyclopentanetetracarboxylic dianhydride (CPDA), 1,2,4,5-cyclohexanetetracarboxylic dianhydride (CHDA), 1,2,4-tricarboxy-3-methylcarboxycyclopentane dianhydride (TMDA), 1,2,3,4-tetracarboxycyclopentane dianhydride (TCDA), and the like.

In the present invention, the (c) aromatic dicarboxylic acid or the derivative thereof may be polymerized with the (a) aromatic diamine to form an amide structure in a chain. Thus, a polyamide-imide film having better optical properties and mechanical properties may be provided.

In some exemplary embodiments, the (c) aromatic dicarboxylic acid or the derivative thereof may be a compound in which two of a carboxylic acid or a derivative of the carboxylic acid are substituted on benzene, biphenyl or naphthalene. The derivative of the carboxylic acid group may include an acid chloride group (—COCl).

In some exemplary embodiments, the (c) aromatic dicarboxylic acid or the derivative thereof may be an aromatic diacid dichloride. For example, the aromatic diacid dichloride may be any one or more selected from isophthaloyl dichloride (IPC), terephthaloyl dichloride (TPC), [1,1'-biphenyl]-4,4'-dicarbonyl dichloride (BPC), 1,4-naphthalene dicarboxylic dichloride (NPC), 2,6-naphthalene dicarboxylic dichloride (NTC), 1,5-naphthalene dicarboxylic dichloride (NEC), and the like.

In an exemplary embodiment of the present invention, the polyamide-imide resin including a fluorine-containing substituent and an aliphatic ring may be prepared by a two-step polymerization reaction. For example, the two-step polymerization reaction may include: polymerizing a first fluorine-based aromatic diamine and an aromatic dicarboxylic acid or a derivative thereof (for example, aromatic diacid dichloride) to prepare a polyamide-based oligomer (step 1); and polymerizing the polyamide-based oligomer, a second fluorine-based aromatic diamine, an aromatic dianhydride, and an alicyclic dianhydride to prepare a polyamic acid (step 2). Thereafter, the polyamic acid may be imidized to prepare the polyamide-imide resin. The first fluorine-based aromatic diamine and the second fluorine-based aromatic diamine may be identical to or different from each other.

As described above, when the polyamide-imide resin is prepared by the two-step polymerization reaction, a polyamide-based oligomer having an amine group at the end is prepared in step 1, which may serve as a monomer in step 2. In this case, a block polyamide-imide resin having a polyamide-based block may be prepared. The block polyamide-imide resin is characterized by having improved optical properties, mechanical properties, and the like. In addition, it has an advantage of a wide range of choice of coating solvents due to solubility variety.

In some exemplary embodiments, the step of preparing a polyamic acid may be solution polymerization of the polyamide-based oligomer, the second fluorine-based aromatic diamine, the aromatic dianhydride, and the alicyclic dianhydride. An organic solvent to be used in the solution polymerization may be any one or more selected from dimethylacetamide (DMAc), N-methyl-2-pyrrolidone (NMP), dimethylformamide (DMF), dimethylformsulfoxide (DMSO), ethylcellosolve, methylcellosolve, acetone, ethylacetate, m-cresol, and the like.

In some exemplary embodiments, a method of imidizing the polyamic acid may be chemical imidization of the polyamic acid using pyridine and an acetic anhydride. In addition, subsequently, the imidization is performed using an imidization catalyst and a dehydrating agent at a low temperature of 150° C. or lower, 100° C. or lower, and specifically 50 to 150° C. In this case, uniform mechanical properties may be imparted to the entire polyamide-imide film as compared with the method of imidizing by heat at a high temperature.

Herein, the imidization catalyst may be anyone or more selected from, for example, pyridine, isoquinoline, β-quinoline, and the like. In addition, the dehydrating agent may be any one or more selected from, for example, an acetic anhydride, a phthalic anhydride, a maleic anhydride, and the like.

In some exemplary embodiments, an additive such as a flame retardant, an adhesion improver, inorganic particles, an antioxidant, a UV inhibitor, and a plasticizer may be mixed with the polyamic acid to prepare the polyamide-imide resin.

In some exemplary embodiments, in step 1, the first fluorine-based aromatic diamine and the aromatic dicarboxylic acid or the derivative thereof may be used at a mole ratio of 1:0.5 to 1:1 or 1:0.5 to 1:0.8.

In some exemplary embodiments, in step 2, a ratio between the total moles of the polyamide-based oligomer and the second fluorine-based aromatic diamine and the total moles of the aromatic dianhydride and the alicyclic dianhydride may be 1:0.9 to 1:1.1 or 1:1.

In some exemplary embodiments, in step 2, an amount of the polyamide-based oligomer used may be 30 mol % or more, 50 mol % or more, or 70 mol % or more with respect to the total moles of the polyamide-based oligomer and the second fluorine-based aromatic diamine. In this case, the optical properties and the mechanical properties of the polyamide-imide film may be further improved. Of course, the present invention is not limited thereto.

In some exemplary embodiments, in step 2, the aromatic dianhydride and the alicyclic dianhydride may be used at a mole ratio of 3:7 to 8:2. This case may be advantageous for the transparency, the yellow index, the mechanical properties of the polyamide-imide film, and the like.

In another exemplary embodiment of the present invention, the polyamide-imide resin including a fluorine-containing substituent and an aliphatic ring may be prepared by a one-step polymerization reaction. For example, the one-step polymerization reaction may include polymerizing a fluorine-based aromatic diamine, an aromatic dianhydride, an alicyclic dianhydride, and an aromatic dicarboxylic acid or a derivative thereof (for example, aromatic diacid dichloride) to prepare a polyamic acid. Thereafter, the polyamic acid may be imidized to prepare the polyamide-imide resin. In this case, a random polyamide-imide resin may be prepared. The random polyamide-imide resin may be somewhat different from the block polyamide-imide resin described above in optical properties, mechanical properties, and solvent sensitivity by surface energy difference, but which is also included in the scope of the present invention.

Herein, the aromatic dianhydride may be used at 40 mol or more or 50 to 80 mol with respect to 100 mol of the fluorine-based aromatic diamine. In addition, the alicyclic dianhydride may be used at 10 to 60 mol with respect to 100 mol of the fluorine-based aromatic diamine.

In addition, the moles of the fluorine-based aromatic diamine and the total moles of the aromatic dianhydride, the alicyclic dianhydride, and the aromatic diacid dichloride may be 1:0.9 to 1:1.1, or 1:1.

In the present invention, the porphyrin-based dye refers to a blue or violet porphyrin-based dye known in the art. The porphyrin-based dye may be combined with the polyamide-imide resin described above to implement excellent light transmittance, yellow index, and haze. In particular, the polyamide-imide film may show a characteristic of maintaining an excellent yellow index even in a repeated temperature change environment.

In an exemplary embodiment of the present invention, a maximum absorption wavelength in a visible light area of the porphyrin-based dye may be 570 nm or more, or 570 to 599 nm in a MEK solvent. In this case, the yellow index, b*, and the like of the polyamide-imide film may be further improved.

An absorbance may be expressed as A=abc by Beer's Law (a: molar absorption coefficient, b: path length, c: molar concentration). That is, as the molar absorption coefficient of a dye is larger, light may be more absorbed, which may be advantageous in a yellow improvement effect. However, when the molar absorption coefficient value of a dye is too large, the light transmittance of a polyamide-imide film is deteriorated. In addition, when the molar absorption coefficient of a dye is too small, a color improvement effect is insignificant, so that it is necessary to use a dye at a relatively large amount, and in this case, the light transmittance of the polyamide-imide film may be deteriorated.

Thus, in an exemplary embodiment of the present invention, a molar absorption coefficient in the maximum absorption wavelength in a visible light area of the porphyrin-based dye may be 10,000 to 1,000,000 L/mol·cm.

In an exemplary embodiment of the present invention, a full width at half maximum (FWHM) for the maximum absorption peak of the porphyrin-based dye may be 100 nm or less, or 50 nm or less. In this case, only a specific color of light may be selectively removed, and a specific color of the polyamide-imide film may be selectively adjusted.

In an exemplary embodiment of the present invention, the porphyrin-based dye may have a molar absorption coefficient at 470 nm of 50,000 L/mol·cm or less. In this case, since light of wavelengths other than a specific wavelength to be removed may be absorbed to a minimum, a specific color of the polyamide-imide film may be more selectively adjusted.

In an exemplary embodiment of the present invention, a solubility of the porphyrin-based dye in N,N-dimethylacetamide (DMAc) may be 0.5 wt % or more. Otherwise, the solubility of the porphyrin-based dye in DMAc may be 3 wt % or more. In this case, the porphyrin-based dye may be uniformly distributed in the polyamide-imide film. Thus, a polyamide-imide film having a uniform color may be prepared.

Hereinafter, a method of preparing the polyamide-imide film of the present invention will be described.

The polyamide-imide film of the present invention may be prepared by applying a polyamide-imide resin solution including the polyamide-imide resin described above, the porphyrin-based dye described above, and a solvent on a substrate, and drying or drying and drawing the applied substrate. That is, the polyamide-imide film may be prepared by a solution casting method.

In an exemplary embodiment of the present invention, a content of the porphyrin-based dye may be 0.0001 to 0.005 parts by weight, or 0.001 to 0.003 parts by weight with respect to 100 parts by weight of the polyamide-imide resin. When the content of the porphyrin-based dye is more than 0.005 parts by weight with respect to 100 parts by weight of the polyamide-imide resin, the transmittance of the polyamide-imide film may be deteriorated due to excessive light absorption, and the film may be blue. In addition, when the content of the porphyrin-based dye is less than 0.0001 parts by weight with respect to 100 parts by weight of the polyamide-imide resin, a color improvement effect of a yellow index, b*, and the like may be insignificant.

In the present invention, the time to mix the porphyrin-based dye and the polyamide-imide resin is not particularly limited. That is, the porphyrin-based dye may be introduced, for example, during preparation of the polyamic acid, immediately after preparation of the polyamic acid, during imidization after preparation of the polyamic acid, or after completion of imidization of the polyamic acid.

In some exemplary embodiments, when the porphyrin-based dye and the polyamide-imide resin (or polyamic acid) are mixed, the porphyrin-based dye is first dissolved in a solvent such as DMAc to prepare a porphyrin-based dye solution, which is then mixed with the polyamide-imide resin (or polyamic acid).

In some exemplary embodiments, the substrate may be, for example, glass, stainless steel, a film, and the like. In addition, the application may be carried out by, for example, a die coater, an air knife, a reverse roll, spray, a blade, casting, gravure, spin coating, and the like.

In the present invention, a thickness of the polyamide-imide film may be, for example, 10 to 250 μm, but is not limited thereto.

Hereinafter, the Examples and Comparative Examples of the present invention will be described. However, the following Examples are only an exemplary embodiment of the present invention, and the present invention is not limited thereto.

Measurement Method of Physical Properties (1) Modulus and Elongation at Break

The prepared film was cut into a size of a thickness of 80 μm, a width of 50 mm, and a length of 10 mm to prepare a specimen. The modulus and the elongation at break of the film were measured using UTM 3365 available from Instron under the conditions of tensioning at 50 mm/min at 25° C., in accordance with ASTM D882.

(2) Light Transmittance (Total Light Transmittance; TT)

The light transmittance of the prepared film was measured using COH-400 available from Nippon Denshoku in a visible light area based on a thickness of 80 μm, in accordance with ASTM D1003.

In addition, the transmittance at a specific wavelength was measured using UV-3600 available from Shimadzu.

(3) Yellow Index

The yellow index of the prepared film was measured using ColorQuest XE (Mode type: Total transmission, Area view: 0.375 in., UV filter: Nominal) available from HunterLab based on a thickness of 80 μm, in accordance with ASTM E313.

(4) Haze

The haze of the prepared film was measured using COH-400 available from Nippon Denshoku based on a thickness of 80 μm, in accordance with ASTM D1003.

(5) Lab Color Coordinate (b*)

The b* value of the prepared film was measured using ColorQuest XE (Mode type: Total transmission, Area view: 0.375 in., UV filter: Nominal) available from HunterLab based on a thickness of 80 μm, in accordance with ASTM E313.

(6) Heat Resistance ($\Delta YI_{heat}$)

The prepared film was cut into a size of a thickness of 80 μm, a width of 40 mm, and a length of 40 mm to prepare a specimen. A heat resistance test was performed, in which in one cycle, the specimen was allowed to stand at 80° C. for 2 hours and then to stand at 25° C. for 2 hours, and 200 cycles were carried out repeatedly.

After completing the heat resistance test, the yellow index of the specimen was measured according to the method of (3), and a yellow index change value $\Delta YI_{heat}$) of the specimen before and after the heat resistance test was confirmed.

EXAMPLE 1

Methylene chloride and 2,2'-bis(trifluoromethyl)benzidine (TFMB) were added to a reactor and sufficiently stirred under a nitrogen atmosphere, terephthaloyl dichloride (TPC) was added thereto, and stirring was performed for 6 hours. Here, a mole ratio of TPC:TFMB introduced was 3:4, and a solid content was adjusted to 10 wt %.

Thereafter, a reaction product was precipitated using an excessive amount of methanol and filtered to obtain a solid content, which was dried under vacuum at 50° C. for 6 hours to prepare a polyamide-based oligomer. The formula weight (FW) of the prepared polyamide-based oligomer was 1670 g/mol.

Next, N,N-dimethylacetamide (DMAc), 100 mol of the prepared polyamide-basedoligomer, and 28.6 mol of TFMB were introduced to the reactor and stirring was sufficiently performed.

Thereafter, 64.3 mol of 4,4'-hexafluoroisopropylidene diphthalic anhydride (6FDA) and 64.3 mol of biphenyl tetracarboxylic dianhydride (BPDA) were sequentially introduced to the reactor and stirred, and were polymerized at 40° C. for 10 hours.

Subsequently, each of pyridine and acetic anhydride was introduced to the reactor at 2.5 times mole (321.5 mol) of the total introduced dianhydride, and stirred at 60° C. for 1 hour. Here, the solid content was adjusted to 12%.

After completing the reaction, CNef-P591 available from CFC Teramate, which is a porphyrin-based dye, was diluted in DMAc, which was introduced at 20 ppm relative to the solid content.

The viscosity of the finally prepared polyamide-imide was 100,000 cps, as measured at 25° C. using a Brookfield viscometer.

The thus-prepared polyamide-imide solution was subjected to solution casting on a glass substrate using an applicator. Thereafter, heat treatment was performed in a vacuum oven at 100° C. for 30 minutes, 200° C. for 30 minutes, and 280° C. for 10 minutes, and then the product was cooled at room temperature.

The polyamide-imide film formed on the glass substrate was separated from the substrate. The thickness of the prepared polyamide-imide film was 80 μm, the modulus thereof was 5.5 GPa, and the elongation at break thereof was 15%. In addition, as a result of measuring the light transmittance at a specific wavelength for the prepared polyamide film, the light transmittance at 590 nm was shown to be lower than the average value of the light transmittance at 540 nm and the light transmittance at 640 nm by 1.2%, and the light transmittance at 630 nm was shown to be lower than the light transmittance at 680 nm by 0.9%.

The light transmittance, YI, b*, the haze, and $\Delta YI_{heat}$ of the prepared polyamide-imide film were measured according to the measurement method and are shown in Table 1.

EXAMPLE 2

A polyamide-imide film having a thickness of 80 μm was prepared in the same manner as in Example 1, except that cyclobutene tetracarboxylic dianhydride (CBDA) was introduced instead of BPDA. The modulus of the prepared polyamide-imide film was 5.4 GPa, and the elongation at break thereof was 21.5%. In addition, as a result of measuring the light transmittance at a specific wavelength for the prepared polyamide film, the light transmittance at 590 nm was shown to be lower than the average value of the light transmittance at 540 nm and the light transmittance at 640 nm by 1.0%, and the light transmittance at 630 nm was shown to be lower than the light transmittance at 680 nm by 0.9%.

The light transmittance, YI, b*, the haze, and $\Delta YI_{heat}$ of the prepared polyamide-imide film were measured according to the measurement method and are shown in Table 1.

Comparative Example 1

A polyamide-imide film having a thickness of 80 μm was prepared in the same manner as in Example 1, except that after completing the reaction, no dye was introduced.

The light transmittance, YI, b*, the haze, and $\Delta YI_{heat}$ of the prepared polyamide-imide film were measured according to the measurement method and are shown in Table 1.

Comparative Example 2

A polyamide-imide film having a thickness of 80 μm was prepared in the same manner as in Example 1, except that 500 ppm of a pigment (Cobalt and Aluminum Blue available from Shepherd, maximum absorption wavelength: 603 nm) was introduced instead of a dye.

The light transmittance, YI, b*, the haze, and $\Delta YI_{heat}$ of the prepared polyamide-imide film were measured according to the measurement method and are shown in Table 1.

Comparative Example 3

A polyamide-imide film having a thickness of 80 μm was prepared in the same manner as in Example 1, except that Sumiplast Violet B available from Sumitomo, which is an anthraquinone-based dye, was introduced instead of a porphyrin-based dye.

The light transmittance, YI, b*, the haze, and $\Delta YI_{heat}$ of the prepared polyamide-imide film were measured according to the measurement method and are shown in Table 1.

Comparative Example 4

A polyamide-imide film having a thickness of 80 μm was prepared in the same manner as in Example 1, except that FASTOGEN Blue CA5380 available from DIC, which is a phthalocyanine-based dye, was introduced instead of a porphyrin-based dye.

The light transmittance, YI, b*, the haze, and $\Delta YI_{heat}$ of the prepared polyamide-imide film were measured according to the measurement method and are shown in Table 1.

Comparative Example 5

A polyamide-imide film having a thickness of 80 μm was prepared in the same manner as in Example 1, except that TFMB, 6FDA, and BPDA were introduced at a mole ratio of 1:0.5:0.5, without introducing TPC.

The light transmittance, YI, b*, the haze, and $\Delta YI_{heat}$ of the prepared polyimide film were measured according to the measurement method and are shown in Table 1.

TABLE 1

| | Light transmittance | Haze | b* | YI | $\Delta YI_{heat}$ |
|---|---|---|---|---|---|
| Example 1 | 88.4 | 0.76 | 0.79 | 1.97 | 0.08 |
| Example 2 | 89.0 | 0.48 | 0.52 | 1.25 | 0.04 |
| Comparative Example 1 | 89.3 | 0.81 | 1.45 | 3.46 | 0.16 |
| Comparative Example 2 | 85.6 | 1.12 | 1.38 | 2.27 | 0.25 |
| Comparative Example 3 | 87.8 | 0.86 | 0.83 | 2.13 | 0.56 |
| Comparative Example 4 | 89.1 | 0.85 | 0.92 | 2.37 | 0.38 |
| Comparative Example 5 | 88.0 | 0.81 | 1.80 | 3.78 | 0.32 |

Referring to Table 1, Examples 1 and 2 showed the light transmittance of 88% or more, the haze of 0.8% or less, and the yellow index (YI) of 2 or less, and thus, excellent optical properties were confirmed.

In particular, in Examples 1 and 2, the $\Delta YI_{heat}$ value was less than 0.1, and thus, it was confirmed that yellow index retention properties were significantly excellent even in a temperature change environment.

However, in Comparative Example 1 in which no dye was introduced, a yellow index of 3.46 was shown, and thus, it was confirmed that the optical properties were inferior.

In addition, in Comparative Example 2 in which a pigment was introduced instead of a dye, the yellow index was improved, but was still more than 2, and thus, was insignificantly improved, and the light transmittance and the haze properties were rather deteriorated.

In Comparative Examples 3 and 4, an anthraquinone-based or phthalocyanine-based dye was employed, and the yellow index was improved, but was still more than 2, and thus, was insignificantly improved.

In particular, in Comparative Examples 3 and 4, the $\Delta YI_{heat}$ value was more than 0.3, and thus, the yellow index was rapidly lowered in a repeated temperature change environment.

In Comparative Example 5 in which a polyimide film was used, the yellow index was excessively high and the $\Delta YI_{heat}$ value was more than 0.3, and thus, the yellow retention properties in a repeated temperature change environment were inferior.

As described above, the polyamide-imide film according to an exemplary embodiment of the present invention, which is a combination of a polyamide-imide resin and a porphyrin-based dye, may show a unique effect, that is, excellent optical properties and excellent yellow index retention properties in a repeated temperature change environment.

What is claimed is:

1. A polyamide-imide film comprising: a polyamide-imide resin and a porphyrin-based dye,
   the polyamide-imide film having a yellow index (YI) of 2 or less and $\Delta YI_{heat}$ of 0.1 or less,
   wherein $\Delta YI_{heat}$ is, when a heat resistance test is performed, a yellow index change value of the polyamide-imide film before and after the heat resistance test, in which in one cycle, the polyamide-imide film is allowed to stand at 80° C. for 2 hours and then to stand at 25° C. for 2 hours, and 200 cycles are carried out repeatedly,
   wherein the polyamide-imide resin is a copolymerized product of an aromatic diamine, a dianhydride, and an aromatic dicarboxylic dichloride, and
   wherein the aromatic diamine includes 2,2'-bis(trifluoromethyl)-benzidine.

2. The polyamide-imide film of claim 1, wherein the polyamide-imide film has a light transmittance in a visible light area of 88% or more and a haze of 0.8% or less when the thickness is 80 μm.

3. The polyamide-imide film of claim 2, wherein the polyamide-imide film has a b* value of −1.3 to 1.3.

4. The polyamide-imide film of claim 1, wherein the polyamide-imide film has a modulus of 3 GPa or more and an elongation at break of 10% or more.

5. The polyamide-imide film of claim 1, wherein the dianhydride includes a fluorine-based aromatic dianhydride and a non-fluorine-based aromatic dianhydride.

6. The polyamide-imide film of claim 1, wherein the dianhydride includes a fluorine-based aromatic dianhydride and an alicyclic dianhydride.

7. The polyamide-imide film of claim 1, wherein a content of the porphyrin-based dye is 0.0001 to 0.005 parts by weight with respect to 100 parts by weight of the polyamide-imide resin.

8. The polyamide-imide film of claim 1, wherein a maximum absorption wavelength in a visible light area of the porphyrin-based dye is 570 to 599 nm in a MEK solvent.

9. The polyamide-imide film of claim 8, wherein a molar absorption coefficient at the maximum absorption wavelength in a visible light area of the porphyrin-based dye is 10,000 to 1,000,000 L/mol·cm.

10. The polyamide-imide film of claim 8, wherein a full width at half maximum (FWHM) for a maximum absorption peak of the porphyrin-based dye is 100 nm or less.

11. The polyamide-imide film of claim 1, wherein a solubility of the porphyrin-based dye in N,N-dimethylacetatmide (DMAc) is 0.5 wt % or more.

12. The polyamide-imide film of claim 1, wherein the porphyrin-based dye has a residual mass at 300° C. of 90% or more as measured at a heating condition of 20° C./min under a nitrogen atmosphere.

\* \* \* \* \*